(12) United States Patent
Cowell et al.

(10) Patent No.: US 8,534,716 B2
(45) Date of Patent: Sep. 17, 2013

(54) GLUELESS PLUMBING UNION

(75) Inventors: Jason M. Cowell, Apex, NC (US); Leonard Richiuso, Raleigh, NC (US)

(73) Assignee: Pentair Water Pool & Spa, Inc., Sanford, NC (US)

( * ) Notice: Subject to any disclaimer, the term of this patent is extended or adjusted under 35 U.S.C. 154(b) by 546 days.

(21) Appl. No.: 12/592,201

(22) Filed: Nov. 20, 2009

(65) Prior Publication Data
US 2011/0121566 A1    May 26, 2011

(51) Int. Cl.
*F16L 19/00* (2006.01)

(52) U.S. Cl.
USPC ........... 285/354; 285/247; 285/349; 285/386; 285/415

(58) Field of Classification Search
USPC .................. 285/354, 245, 247, 386–387, 95, 285/349, 414–415
See application file for complete search history.

(56) References Cited

U.S. PATENT DOCUMENTS

| | | | | |
|---|---|---|---|---|
| 434,804 | A | * | 8/1890 | Quiggin ........................ 138/177 |
| 1,307,392 | A | * | 6/1919 | Codd ............................ 285/329 |
| 2,600,162 | A | * | 6/1952 | Frantz ......................... 285/334.4 |
| 5,845,946 | A | * | 12/1998 | Thomas ......................... 285/348 |
| 6,050,609 | A | * | 4/2000 | Boscaljon et al. .............. 285/81 |
| 7,222,889 | B2 | * | 5/2007 | Breay ........................... 285/354 |

* cited by examiner

*Primary Examiner* — Aaron Dunwoody
*Assistant Examiner* — Fannie Kee
(74) *Attorney, Agent, or Firm* — J. Wiley Horton (57) ABSTRACT

A glueless union suitable for joining piping and other plumbing components. Several components are used to create the union. The portion of each plumbing component that is to be joined is a circular, thick-walled section which is centered on a central axis. This portion has a mating face that is perpendicular to the central axis. The union includes an annular face seal which is compressed between the opposing mating faces of the plumbing components to be joined.

14 Claims, 9 Drawing Sheets

GLUELESS PLUMBING UNION

BACKGROUND OF THE INVENTION

1. Field of the Invention

This invention relates to the field of plumbing. More specifically the invention comprises an assembly for joining two plumbing components without the use of adhesives.

2. Description of the Related Art

Figure 1:
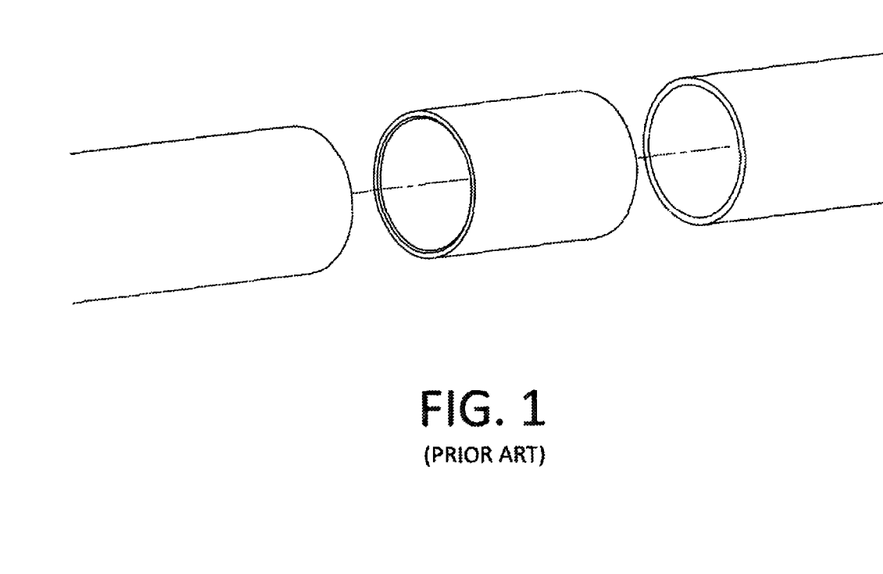
FIG. 1 is a perspective view, showing a prior art plumbing connection.

Poly vinyl chloride ("PVC") piping and plumbing components have become increasingly common in recent years. Such components are typically joined using an adhesive ("PVC cement"). FIG. 1 shows a typical assembly in the prior art. The installation requires that two plumbing components (in this example two pipes 10) be joined together. Coupler 12 is used for this purpose. Coupler 12 includes inner diameter 14, which is sized to be a close sliding fit over the outer diameter of each of the two pipes 10. The mating surfaces are typically cleaned and primed, then coated with PVC cement. The two pipes are then slipped into coupler 12. The coupler often has an internal stop—a ring having a reduced diameter—which prevents either pipe being shoved in too far.

The PVC cement will cross-link in a matter of minutes and gain sufficient strength to hold the components together. It will continue to harden and the completed assembly is typically ready for pressurization in about one hour. Thus, the prior art components can be joined effectively using PVC cement.

This approach is not without disadvantages however. A first disadvantage is the delay involved. The installer must assemble the components and then wait to test them. This is a particular concern for a technician who is installing pool pump and filtration lines. These must be carefully spaced in order to properly locate the components they connect. As some of these lines run at 25-50 psi, the installer often must wait for the PVC cement to fully cure before testing.

In addition, prolonged exposure to PVC primers and cements can be hazardous to human health. Persons using these chemicals are cautioned to use protective gloves and masks, but many choose to ignore this safety measure. The cement can also contaminate surrounding components.

Glueless plumbing connections therefore offer advantages over the use of PVC cement. Such connections are certainly known in the art. However, these tend to operate by compressing a gasket against a flange or flare. They must generally be assembled in a predetermined order. For example, a compression nut must be slipped on a piece of piping from the end of the pipe that is distal to the joint being made, since the nut cannot pass over the flare or flange which lies next to the joint. This fact obviously limits the application of the prior art compression unions. Accordingly, a glueless plumbing union which can be assembled entirely from the end of the pipe adjacent to the joint would be desirable.

BRIEF SUMMARY OF THE INVENTION

The present invention comprises a glueless union suitable for joining piping and other plumbing components. Several pieces are combined to create the union. The portion of each plumbing component that is to be joined has a circular, thick-walled section which is centered on a central axis. Each such section has a mating face which is perpendicular to the central axis. The union includes an annular face seal which is compressed between the opposing mating faces of the plumbing components to be joined.

A first engagement feature such as an external thread is provided on the first plumbing component to be joined. A circumferential clip receiver is provided on the second plumbing component to be joined. A union nut is passed along the component having the clip receiver. A C-clip is then temporarily expanded and snapped into the clip receiver. The union nut is then advanced toward the first component. The union nut engages the C-clip, which forces the second component toward the first component—thereby compressing the annular face seal and forming the joint. The union nut includes a second engagement feature—such as a female thread—which is configured to attach to the first engagement feature on the first plumbing component. The two engagement features are used to pull the first and second plumbing components tightly together.

REFERENCE NUMERALS IN THE DRAWINGS 10 pipe
12 coupler
14 inner diameter
16 external thread
18 face seal
20 C-clip
22 union nut
24 central axis
26 clip receiver
28 annular clevis
30 annular tang
32 gasket overlay
34 protrusion
36 first mating surface
38 second mating face
40 gap
42 internal thread
44 nut bearing surface
46 C-clip bearing surface
48 C-clip angled surface
50 clip receiver angled surface
52 protrusion
54 void
56 minor diameter
58 outer surface
60 diamond face seal
62 diamond seal groove

DETAILED DESCRIPTION OF THE INVENTION

Figure 2:
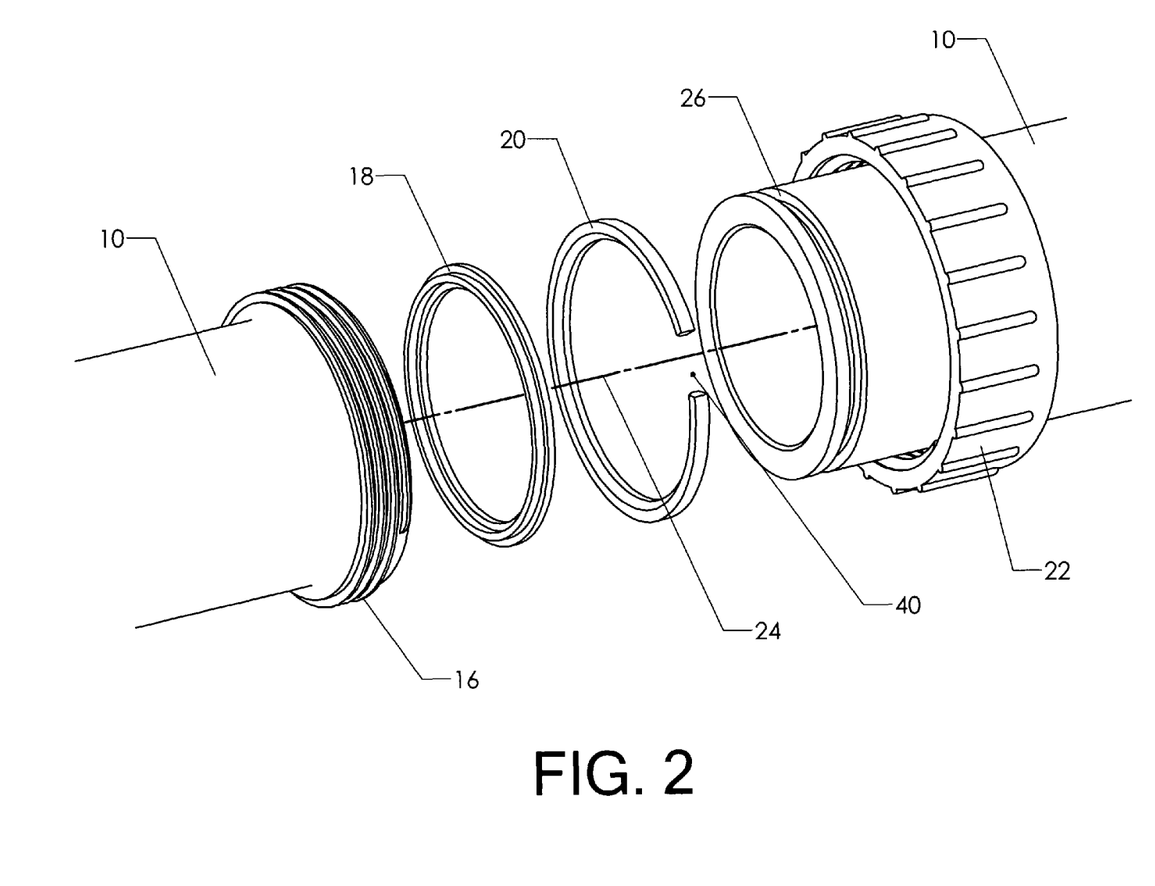
FIG. 2 is an exploded perspective view, showing the components of the present invention.

FIG. 2 shows the components of the present invention in an exploded state. The glueless union is an assembly which is capable of joining a first and second plumbing component together. In FIG. 2, the first and second plumbing components are pipes 10 aligned along central axis 24. Examples of other plumbing components include filters, pumps, valves, etc. Each of these types of components can be provided with mating features made according to the present invention. The illustrations provided show pipes, but any other plumbing component could be substituted.

The first plumbing component (pipe 10) is shown in the left hand side of the view. It is provided with an engagement feature configured to engage another engagement feature on the second plumbing component (the right hand pipe 10 in the view). This engagement feature can assume a variety of forms. In the embodiment shown external thread 16 is used as the engagement feature on the first plumbing component.

Face seal 18 is designed to be compressed between the two plumbing components and thereby form a pressure-tight seal. It has an unbroken circumference. (There are no gaps in its circumference). Clip receiver 26 is an annular groove cut into the exterior surface of the second plumbing component. C-clip 20 is designed to snap into clip receiver 26. The reader will note that C-clip 20 includes gap 40. This feature allows the C-clip to expand and pass over the outer diameter of the second plumbing component. The diameter of the C-clip is preferably sized so that—in a relaxed state—it is smaller than the outer diameter of the second plumbing component. Thus, the user must expand C-clip 20 to pass over the right hand pipe 10. Once it reaches the position of clip receiver 26. C-clip 20 is able to contract (gap 40 will narrow) and snap into clip receiver 26.

Union nut 22 is sized to slide over pipe 10. It contains an engagement feature or features configured to engage the engagement feature or features on the first plumbing component. In the embodiment shown, union nut 22 has an internal thread sized to engage external thread 16. The reader should note that the use of the term union "nut" does not imply a hexagonal external perimeter for this component, or any other particular shape. In fact, many embodiments may be configured to be hand-tightened. Thus, the exterior of union nut 22 is preferably covered with grip-enhancing features such as raised ribs.

Figure 3:
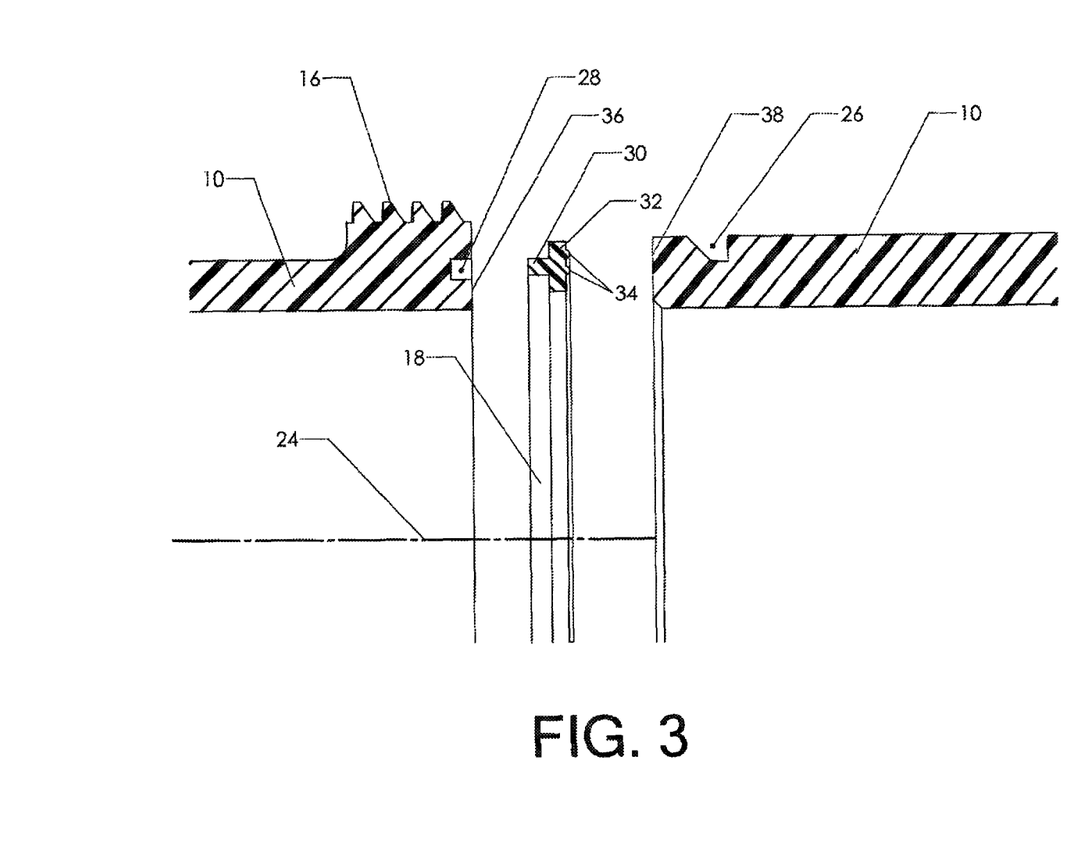
FIG. 3 is a detailed section view, showing the relative position of the face seal with respect to the components being joined.

FIG. 3 is a detailed section view showing how the components of the glueless union assembly fit together. The union is designed to work by clamping face seal 18 between first mating face 36 (on the first plumbing component) and second mating face 38 (on the second plumbing component). It is preferable to provide a mechanical interlocking feature between face seal 18 and one or both of the plumbing components so that the face seal is properly positioned. In the embodiment shown, annular clevis 28 is provided in first mating face 36. A corresponding annular tang 30 is provided on one side of the face seal. The user may properly place the face seal by pressing annular tang 30 into annular clevis 28. One or more protrusions 34 are provided on the side of the face seal opposite annular tang 30. These form annular ring seals when they are pressed against second mating face 38. The tang and clevis joint allows the face seal to remain in position while the union is assembled and may in some instances allow the union to remain sealed under higher pressures.

Those skilled in the art will realize that the mechanical interlock feature between the plumbing component and the face seal could assume a virtually endless variety of forms. Likewise, the annular clevis could just as easily be provided in second mating face 38 of the second plumbing component. It is also possible to provide a tang in one of the mating faces and a clevis in the face seal.

Figure 4:
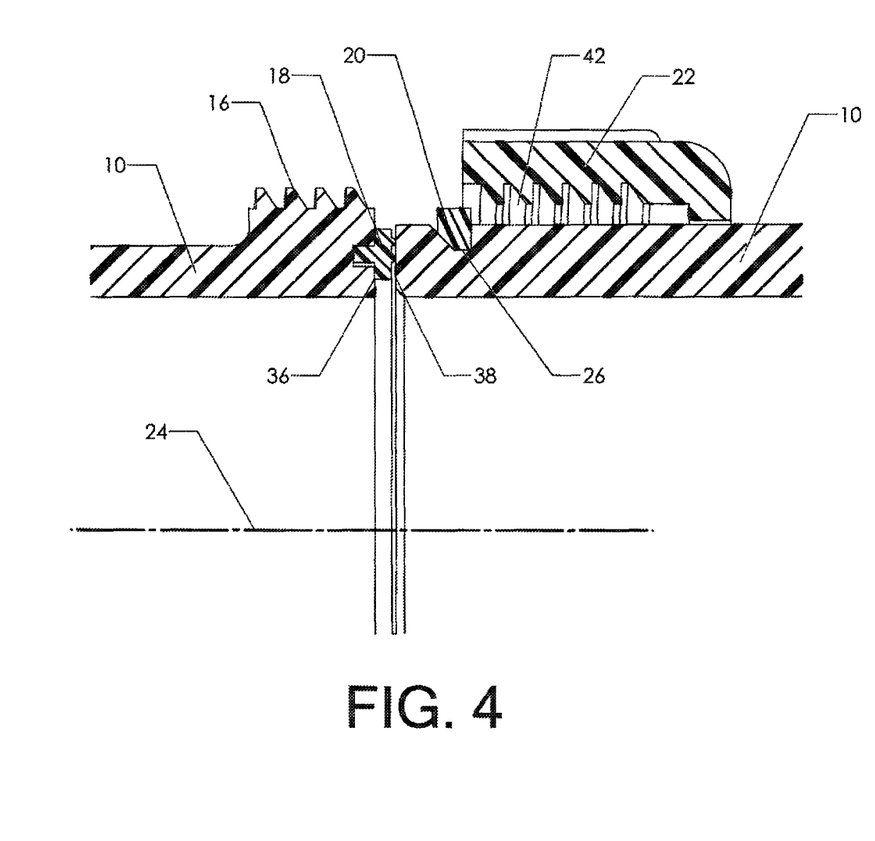
FIG. 4 is a detailed section view, showing all the components in position for assembly.

In the embodiment illustrated, external thread 16 is provided in the exterior of the first plumbing component proximate first mating face 36. Clip receiver 26 is provided in the exterior of the second plumbing component proximate second mating face 38. FIG. 4 shows all the components in position for assembly. The reader may benefit from some understanding of the preferred order of operations for creating a completed assembly. Union nut 22 is placed over the right hand pipe 10 and moved down its length (a short distance away from second mating surface 38). C-clip 20 is then slipped over the right hand pipe 10 and snapped into clip receiver 26. The reader will observe that once C-clip 20 is snapped into the clip receiver, internal thread 42 on union nut 22 is able to pass over the exterior of the C-clip and advance toward external thread 16 on the left hand pipe 10.

Figure 5:
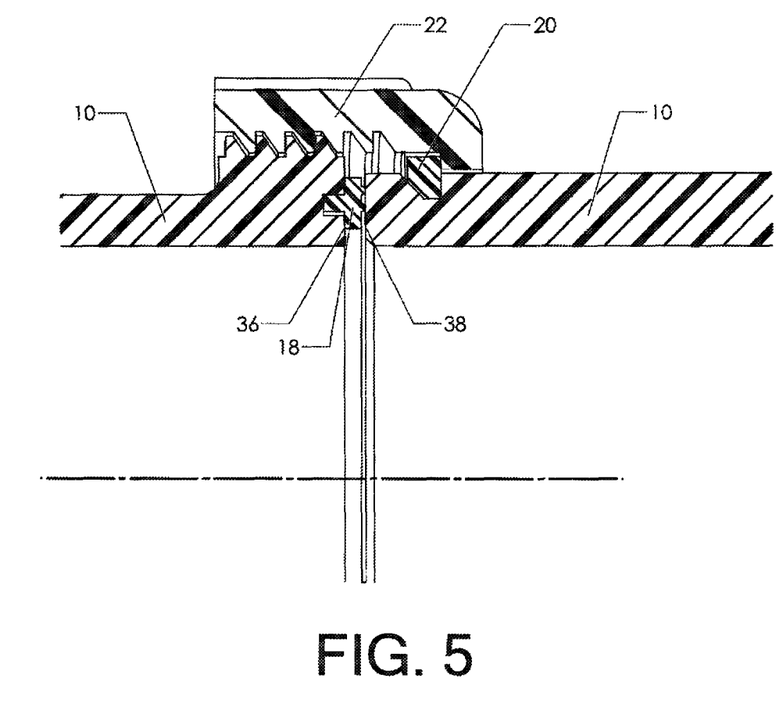
FIG. 5 is a detailed section view, showing all the components after an assembly is completed.

Face seal 18 is appropriately positioned between the two mating surfaces. Forcing the two mating surfaces toward each other will then form a pressure-tight seal. FIG. 5 shows the same assembly after union nut 22 has been threaded onto external thread 16 and tightened. The reader will observe how face seal 18 is appropriately positioned and compressed between first mating surface 36 and second mating surface 38.

Figure 6:
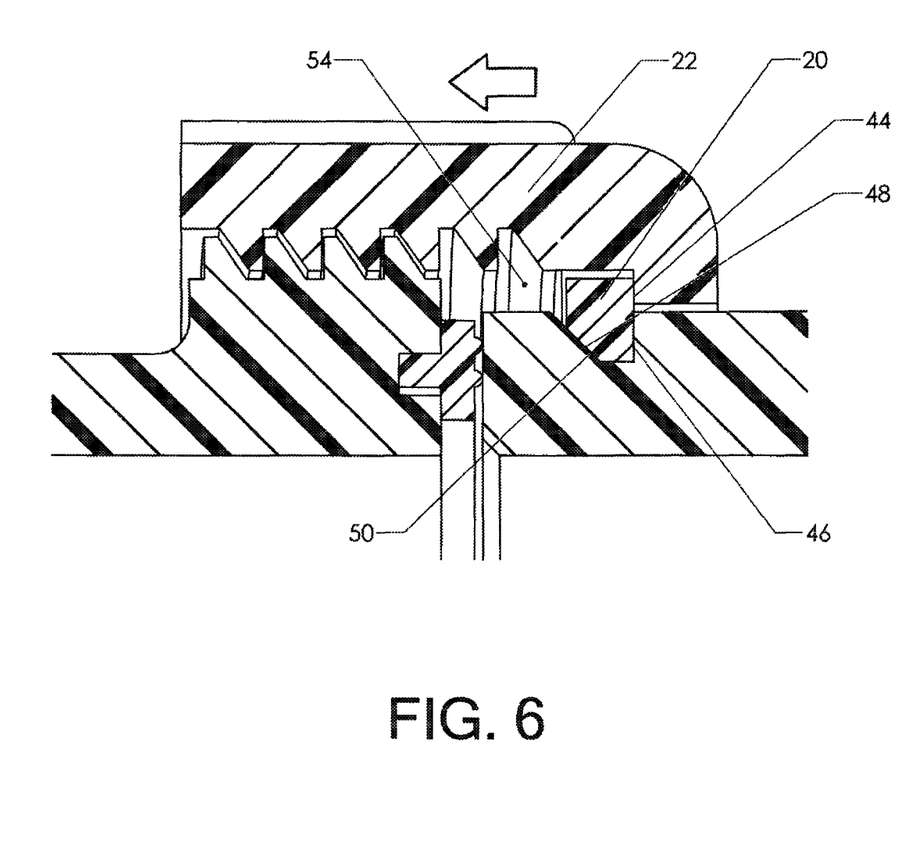
FIG. 6 is a detailed section view, showing additional details from the configuration of FIG. 5.

FIG. 6 shows the same assembly in more detail. Union nut 22 has nut bearing surface 44 which is positioned to bear against C-clip bearing surface 46. Thus, as the union nut is tightened, it will urge the C-clip toward the first plumbing component. Of course, the C-clip is engaged into the clip receiver on the second plumbing component, so the tightening of the union nut thereby urges the first and second plumbing components together.

The clip receiver is preferably provided with clip receiver angled surface 50. This bears against C-clip angled surface 48, thereby creating a wedging effect between these two frusto-conical surfaces. The result is that the C-clip is urged outward into tight contact with the union nut, thereby ensuring appropriate engagement during the tightening process.

Figure 7:
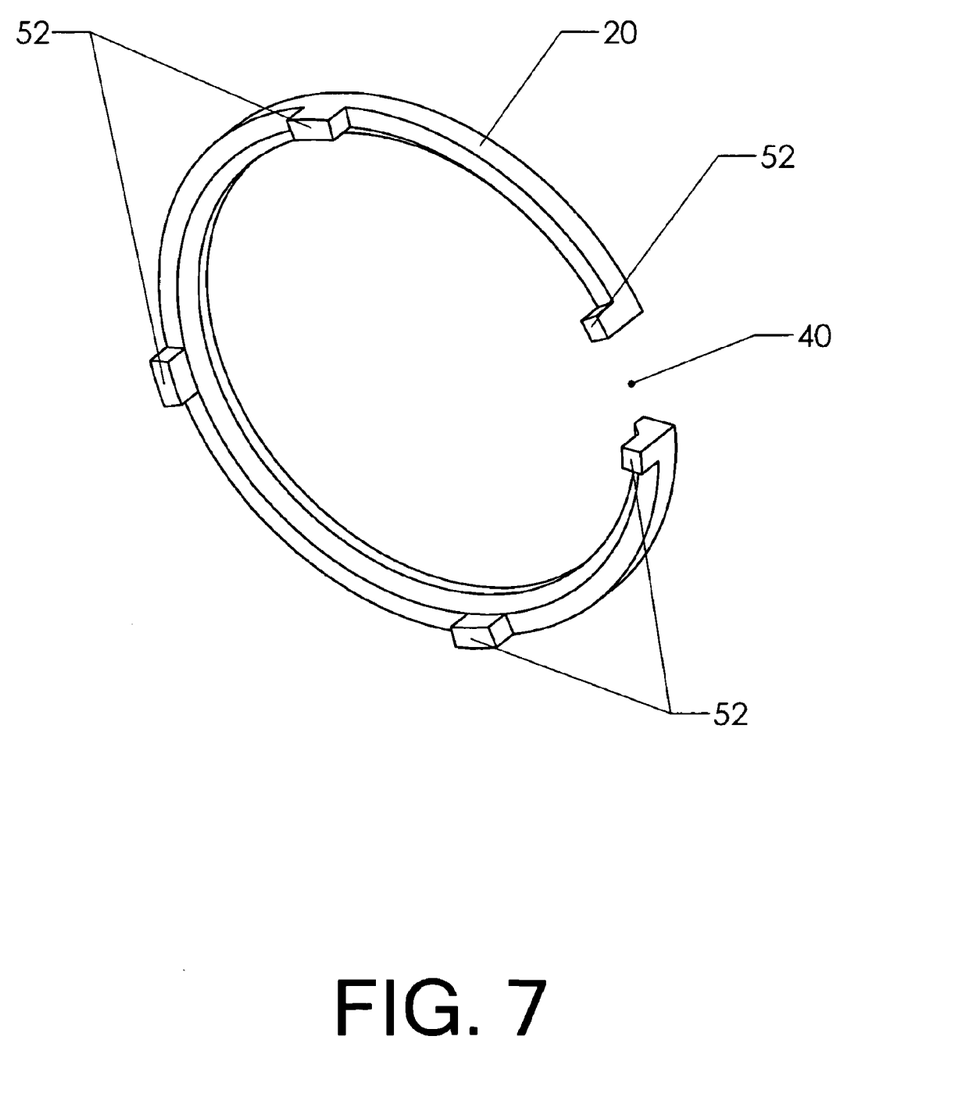
FIG. 7 is a detailed perspective view, showing some features of the C-clip.

FIG. 6 also shows how the components can be sized to create an annular void 54 between the first plumbing component and C-clip 20. FIG. 7 shows a detailed perspective view of C-clip 20 in the vicinity of gap 40. It is preferable for the C-clip to be snapped into the clip receiver in the proper orientation (as shown in FIG. 6). However, it is possible for a user to attempt to snap the C-clip in place in a reversed orientation. FIG. 7 shows how features can be provided on the side of the C-clip which is intended to face the first plumbing component. One or more protrusions 52 can be provided on this side. These fit easily into void 54 if the C-clip is installed correctly. If the C-clip is installed incorrectly, however, protrusions 52 will bear against the internal threads on the union nut and the user will note this problem. The protrusions are preferably sized so that the leading portion of the union nut cannot pass over the C-clip (and thereby hide it from the user's sight) before the protrusions bear against the internal threads and thereby arrest any further motion of the union nut.

Figure 8:
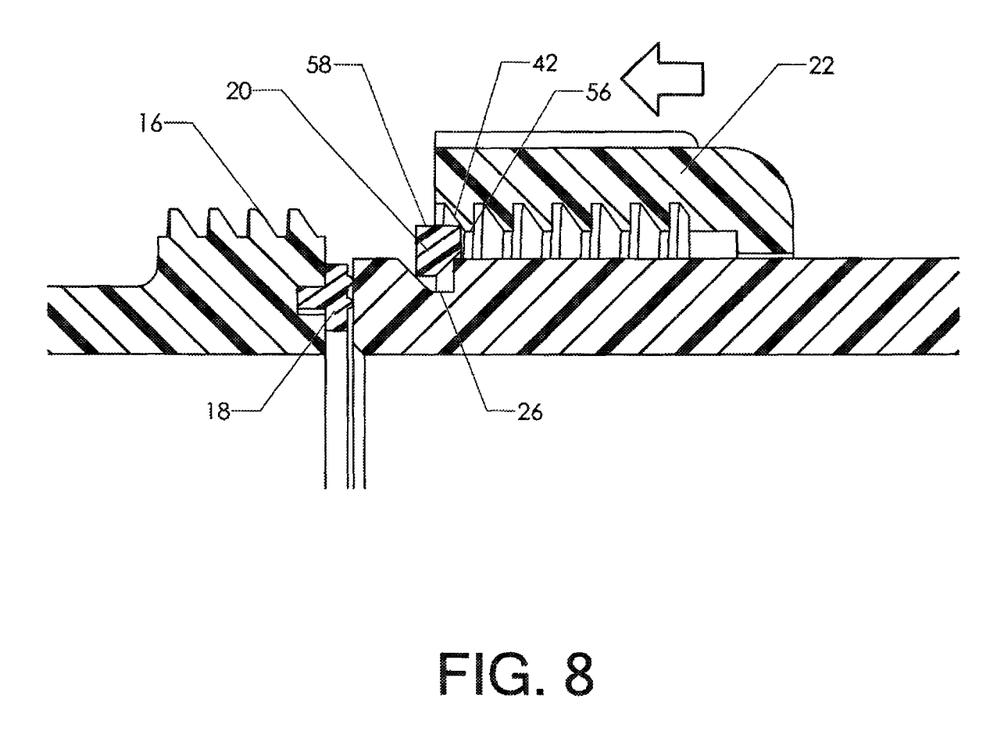
FIG. 8 is a detailed section view, showing the C-clip in a reversed orientation.

FIG. 8 illustrates another feature intended to prevent incorrect installation of the C-clip. In FIG. 8, C-clip 20 has been installed with C-clip angled surface 48 facing away from the first plumbing component rather than toward it. The angled surface on the C-clip is therefore not positioned to mate against the angled surface in clip receiver 26. The result is that C-clip 20 will only snap part of the way into the clip receiver, and outer surface 58 of C-clip 20 will protrude further outward than would be the case if the C-clip were properly installed.

The engagement features on union nut 22 can be sized to cause an interference in this scenario. Internal thread 42 is sized so that its minor diameter 56 passes just over outer surface 58 of the C-clip when the C-clip is properly installed. If, however, the C-clip is installed in the wrong orientation (as shown in FIG. 8), internal thread 42 strikes the C-clip and will not allow union nut 22 to advance toward external thread 16. Thus, the fact that the C-clip has been improperly installed will be made apparent to the user.

Many variations on the embodiment shown will be apparent to those skilled in the art. As one example, a female thread in a receiving collar could be provided on the first plumbing component and the union nut could be provided with an external male thread sized to engage this female thread. Of course, threads are certainly not the only type of engagement features that could be provided. A bayonet lug type of engagement could be provided. Camming levers could also be used to draw the first and second plumbing components together. Thus, the use of threads in the illustrated embodiments should properly be viewed as exemplary.

Figure 9:
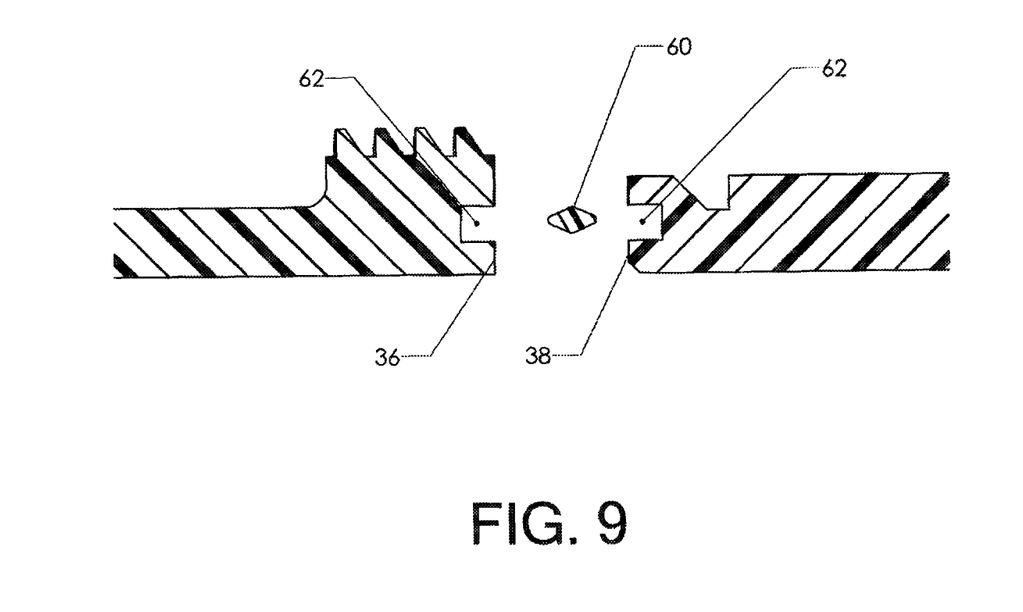
FIG. 9 is a detailed section view, showing an alternate embodiment for the face seal.

The specific type of face seal used is likewise open to many variations. FIG. 9 shows a different type of face seal. Diamond face seal 60 is still designed to be compressed between first mating surface 36 and second mating surface 38. However, it is retained by the use of an annular groove on both mating surfaces. The reader will note the presence of an annular groove 62 in first mating surface 36 and an annular groove 62 in second mating surface 38. As the two plumbing components are pulled together diamond face seal 60 compresses into the two annular grooves and forms an effective seal. An example of such a sealing device is the DIAMOND SEAL product (a diamond-shaped face seal) offered by Parker Hannifin Corporation of Syracuse, Ind.

The preceding description contains significant detail regarding the novel aspects of the present invention. It should not be construed, however, as limiting the scope of the invention but rather as providing illustrations of the preferred embodiments of the invention. Thus, the scope of the invention should be fixed by the following claims, rather than by the examples given.

Having described our invention, we claim:

1. A plumbing union assembly, comprising:
   a. a first plumbing component, with said first plumbing component being aligned along a central axis and having a first planar mating face that is substantially perpendicular to said central axis, said first planar mating face being an annular surface bounded by an inner diameter and an outer diameter;
   b. a second plumbing component, with said second plumbing component being aligned along said central axis and having a second planar mating face facing said first planar mating face and being parallel thereto, said second planar mating face being an annular surface bounded by an inner diameter and an outer diameter;
   c. said inner diameter of said second planar mating face being equivalent to said inner diameter of said first planar mating surface;
   d. a face seal positioned between said first and second planar mating faces;
   e. an external thread located on said first plumbing component adjacent to said first planar mating face;
   f. a clip receiver located on said second plumbing component adjacent to said second planar mating face, said clip receiver having a clip receiver angled surface;
   g. a C-clip located in said clip receiver, said C-clip having a C-clip bearing surface and a C-clip angled surface;
   h. a union nut slidably mounted on said second plumbing component, said union nut having an internal thread sized to engage said external thread and a nut bearing surface positioned to bear against said C-clip bearing surface and urge said C-clip and said second plumbing component toward said first plumbing component as said internal threads on said union nut are threaded onto said external threads on said first plumbing component, thereby urging said second planar mating face toward said first planar mating face and compressing said face seal between said first and second planar mating faces;
   i. wherein said C-clip is configured to be installed in said clip receiver in a first orientation wherein the C-clip angled surface faces toward and bears against the clip receiver angled surface and a second orientation wherein the C-clip angled surface faces away from the clip receiver angled surface; and
   j. wherein when said C-clip is in said first orientation said union nut may pass over said C-clip but when said C-clip is in said second orientation said C-clip prevents said union nut from engaging said first plumbing component.

2. A plumbing union assembly as recited in claim 1, further comprising:
   a. an annular opening in one of said first and second mating faces; and
   b. a protrusion on a first side of said face seal configured to engage said annular opening.

3. A plumbing union assembly as recited in claim 2, further comprising at least one additional protrusion on a second side of said face seal, said second side of said face seal being opposite said first side of said face seal.

4. A plumbing union assembly as recited in claim 1, further comprising at least one protrusion on said face seal, said at least one protrusion being positioned to bear against one of said first and second mating faces.

5. A plumbing union assembly as recited in claim 1, wherein:
   a. said C-clip has a first side and a second side;
   b. when said C-clip is in said first orientation said first side faces toward said second mating face and when said C-clip is in said second orientation said first side faces away from said second mating face;
   c. said C-clip has an outer surface;
   d. said internal thread on said union nut has a minor diameter;
   e. in said first orientation said minor diameter passes over said outer surface of said C-clip; and
   f. in said second orientation said minor diameter cannot pass over said outer surface of said C-clip, thereby preventing said union nut from engaging said first plumbing component.

6. A plumbing union assembly, comprising:
   a. a first plumbing component having a first planar mating face, said first planar mating face being an annular surface bounded by an inner diameter and an outer diameter;
   b. a second plumbing component, having a second planar mating face facing said first planar mating face and being parallel thereto, said second planar mating face being an annular surface bounded by an inner diameter and an outer diameter;
   c. said inner diameter of said second planar mating face being equivalent to said inner diameter of said first planar mating surface;
   d. a first thread located on said first plumbing component adjacent to said first mating face;
   e. a clip receiver located on said second plumbing component adjacent to said second mating face, said clip receiver having a clip receiver angled surface;

f. a C-clip located in said clip receiver, said C-clip having a C-clip bearing surface and a C-clip angled surface;

g. a union nut slidably mounted on said second plumbing component, said union nut having a second thread having a minor diameter, said second thread being sized to engage said first thread and said union nut having a nut bearing surface positioned to bear against said C-clip bearing surface and urge said C-clip and said second plumbing component toward said first plumbing component as said second thread on said union nut is engaged to said first thread on said first plumbing component;

h. a face seal positioned between said first and second planar mating faces whereby said face seal is compressed between said first and second mating faces as said first plumbing component is urged toward said second plumbing component;

i. wherein said C-clip is configured to be installed in said clip receiver in a first orientation wherein the C-clip angled surface faces toward and bears against the clip receiver angled surface and a second orientation wherein the C-clip angled surface faces away from the clip receiver angled surface; and j. wherein when said C-clip is in said first orientation said union nut may pass over said C-clip but when said C-clip is in said second orientation said C-clip prevents said union nut from engaging said first plumbing component.

7. A plumbing union assembly as recited in claim 6, further comprising:
   a. an annular opening in one of said first and second mating faces; and
   b. a protrusion on a first side of said face seal configured to engage said annular opening.

8. A plumbing union assembly as recited in claim 7, further comprising at least one additional protrusion on a second side of said face seal, said second side of said face seal being opposite said first side of said face seal.

9. A plumbing union assembly as recited in claim 6, further comprising at least one protrusion on said face seal, said at least one protrusion being positioned to bear against one of said first and second mating faces.

10. A plumbing union assembly as recited in claim 6, wherein:
   a. said C-clip has a first side and a second side;
   b. when said C-clip is in said first orientation said first side faces toward said second mating face and when said C-clip is in said second orientation said first side faces away from said second mating face;
   c. said C-clip has an outer surface;
   d. in said first orientation said minor diameter on said union nut passes over said outer surface of said C-clip; and
   e. in said second orientation said minor diameter cannot pass over said outer surface of said C-clip, thereby preventing said union nut from engaging said first plumbing component.

11. A plumbing union assembly, comprising:
   a. a first plumbing component having a first mating face;
   b. a second plumbing component, having a second mating face facing said first mating face;
   c. a face seal positioned between said first and second mating faces;
   d. said face seal having an unbroken circumference having an inner diameter and an outer diameter;
   e. a mechanical interlock between said face seal and one of said first and second mating faces;
   f. a first engagement feature located on said first plumbing component adjacent to said first mating face;
   g. a clip receiver located on said second plumbing component adjacent to said second mating face, said clip receiver having a clip receiver angled surface;
   h. a C-clip located in said clip receiver, said C-clip having a C-clip bearing surface and a C-clip angled surface;
   i. a union nut slidably mounted on said second plumbing component, said union nut having a second engagement feature sized to engage said first engagement feature and a nut bearing surface positioned to bear against said C-clip bearing surface and urge said C-clip and said second plumbing component toward said first plumbing component as said second engagement feature on said union nut is engaged to said first engagement feature on said first plumbing component;
   j. said first mating face being an annular surface bounded by an inner diameter and an outer diameter;
   k. said second mating face being parallel to said first mating face, and said second mating face being an annular surface bounded by an inner diameter and an outer diameter;
   l. said inner diameter of said second mating face being equivalent to said inner diameter of said first mating face;
   m. wherein said C-clip is configured to be installed in said clip receiver in a first orientation wherein the C-clip angled surface faces toward and bears against the clip receiver angled surface and a second orientation wherein the C-clip angled surface faces away from the clip receiver angled surface; and
   n. wherein when said C-clip is in said first orientation said union nut may pass over said C-clip but when said C-clip is in said second orientation said C-clip prevents said union nut from engaging said first plumbing component.

12. A plumbing union assembly as recited in claim 11, wherein said mechanical interlock between said face seal and one of said first and second mating faces comprises:
   a. an annular opening in one of said first and second mating faces; and
   b. a protrusion on a first side of said face seal configured to engage said annular opening.

13. A plumbing union assembly as recited in claim 12, further comprising at least one additional protrusion on a second side of said face seal, said second side of said face seal being opposite said first side of said face seal.

14. A plumbing union assembly as recited in claim 11, further comprising at least one protrusion on said face seal, said at least one protrusion being positioned to bear against one of said first and second mating faces.

* * * * *